United States Patent
Kawakami et al.

(10) Patent No.: US 6,183,679 B1
(45) Date of Patent: Feb. 6, 2001

(54) PRODUCTION PROCESS FOR INJECTION-MOLDED PRODUCT OF POLYGLYCOLIC ACID

(75) Inventors: Yukichika Kawakami; Nobuo Sato; Mitsuru Hoshino; Toshitaka Kouyama, all of Fukushima; Zenya Shiiki, Chiba, all of (JP)

(73) Assignee: Kureha Kagaku Kogyo, K.K., Tokyo (JP)

( * ) Notice: Under 35 U.S.C. 154(b), the term of this patent shall be extended for 0 days.

(21) Appl. No.: 09/504,604

(22) Filed: Feb. 15, 2000

Related U.S. Application Data

(62) Division of application No. 08/844,361, filed on Apr. 18, 1997, now Pat. No. 6,046,251.

(30) Foreign Application Priority Data

Apr. 30, 1996 (JP) .................................................. 8-134219
Apr. 8, 1997 (JP) .................................................. 9-105162

(51) Int. Cl.[7] .................................................. B29C 45/00
(52) U.S. Cl. ........................ 264/143; 264/235; 264/328.16
(58) Field of Search ................................... 264/143, 235, 264/328.1, 328.16, 328.17, 28, 328.14

(56) References Cited

U.S. PATENT DOCUMENTS

| | | |
|---|---|---|
| 2,676,945 | 4/1954 | Higgins . |
| 3,620,218 | 11/1971 | Schmitt et al. . |
| 4,473,670 | 9/1984 | Kessidis . |
| 4,496,446 | 1/1985 | Ritter et al. . |
| 4,612,923 | 9/1986 | Kronenthal . |
| 4,808,351 | 2/1989 | Muckherjee et al. . |
| 5,084,050 | 1/1992 | Draenert . |
| 5,321,113 | 6/1994 | Cooper et al. . |
| 5,502,158 | 3/1996 | Sinclair et al. . |

FOREIGN PATENT DOCUMENTS

| | | |
|---|---|---|
| 0533314 | 3/1993 | (EP) . |
| 0562528 | 9/1993 | (EP) . |
| 6-256480 | 9/1994 | (JP) . |
| 6-256481 | 9/1994 | (JP) . |

OTHER PUBLICATIONS

European Search Report for Application No. 97302905.1 dated Sep. 4, 1997.
D.K. Gilding et al (1979) *Polymer*; vol. 20, pp. 1459–1463.

*Primary Examiner*—Jan H. Silbaugh
*Assistant Examiner*—Kenneth M. Jones
(74) *Attorney, Agent, or Firm*—Dinsmore & Shohl LLP

(57) ABSTRACT

The invention provides an injection-molded product of polyglycolic acid obtainable by molding a thermoplastic resin material at an injection temperature ranging from the melting point, Tm of the polymer to 255° C., wherein the thermoplastic resin material comprises polyglycolic acid having a repeating unit represented by the following formula (1):

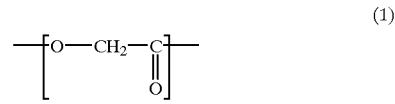

(1)

and the following physical properties:
(a) the melt viscosity, $\eta^*$ [as measured at a temperature of (the melting point, Tm of the polymer+20° C.) and a shear rate of 1,000/sec] being 30–10,000 Pa·s;
(b) the melting point, Tm being at least 150° C.;
(c) the melt enthalpy, $\Delta Hm$ being at least 20 J/g; and
(d) the density being at least 1.50 g/cm$^3$ as measured in an unoriented, crystallized form, and a production process thereof.

4 Claims, No Drawings

PRODUCTION PROCESS FOR INJECTION-MOLDED PRODUCT OF POLYGLYCOLIC ACID

This application is a divisional application of application Ser. No. 08/844,361, filed Apr. 18, 1997, now U.S. Pat. No. 6,046,251.

FIELD OF THE INVENTION

The present invention relates to an injection-molded product formed from a thermoplastic resin material comprising polyglycolic acid, and more particularly to an injection-molded product of polyglycolic acid, which has excellent degradability in soil, impact resistance, toughness and heat resistance, and to a production process thereof. The injection-molded product of polyglycolic acid according to the present invention can be used in a wide variety of fields as, for example, daily sundries, stationery products, electric appliances, containers for electronic ranges, containers for boiling water pouring type instant food and various kinds of disposable ware.

BACKGROUND OF THE INVENTION

In recent years, increase in plastic waste has become a great social problem. Since many of polymeric materials have hitherto been developed and produced in search of high performance and long-term stability, they are not easily decomposed in a natural environment. Therefore, how to dispose and manage a large quantity of plastic waste which has become useless becomes a social problem on a world-wide scale. The plastic waste includes injection-molded products formed from a variety of synthetic resins, such as polyolefin resins such as polyethylene and polypropylene, polyester resins such as polyethylene terephthalate, polyamide resins such as nylon, chlorine-containing resins such as polyvinylidene chloride, polystyrene, ABS resins, polyacetal, and polycarbonate.

Under the circumstances, biodegradable polymers, which are degraded by natural microorganisms, attract attention as polymeric materials which impose no burden on the environment. The biodegradability can be evaluated by, for example, a degradability test in soil (soil degradability test). Since injection-molded plastic products are required to have good impact resistance, toughness, heat resistance, melt processability, profitability and the like, however, any injection-molded plastic product, which fully satisfies these requirements and exhibits biodegradability, has not been yet obtained.

Among the conventional biodegradable injection-molded plastic products, for example, injection-molded products based on starch are unsatisfactory in toughness and heat resistance and involve a problem that such a plastic material is difficult to injection-mold because it is non-crystallizable. Injection-molded product based on cellulose are unsatisfactory in impact resistance, toughness and heat resistance and involve a problem that such a plastic material is difficult to injection-mold because it is low in crystallizability. Injection-molded products based on a microorganism-produced polyester involve a great problem that their production cost is very high. Injection-molded products based on a synthetic type polyester such as a polysuccinate are unsatisfactory in impact resistance, toughness and heat resistance and involve a problem that succinic acid and butanediol, which are raw materials for the polyester, are considerably expensive in addition to the fact that such a plastic material is unsatisfactory in injection moldability.

Injection-molded products based on polylactic acid, which is a semi-synthetic type polyester, must be produced through fermentation of a biological process because L-lactic acid, which is an optically active substance used as a raw material, is required to have a high purity. There is hence a limit to their production at low cost. Further, since polylactic acid has a high glass transition temperature, Tg, it also involves a problem that it is difficult to compost under ordinary composting conditions.

OBJECTS AND SUMMARY OF THE INVENTION

It is an object of the present invention to cheaply provide an injection-molded plastic product, which has excellent impact resistance, toughness and heat resistance and exhibits high degradability in soil.

The present inventors have carried out an extensive investigation with a view toward overcoming the above problems involved in the prior art. As a result, it has been found that an injection-molded product formed from a thermoplastic resin material comprising polyglycolic acid having specific physical properties exhibits good degradability in soil, has excellent impact resistance, toughness and heat resistance and sufficient physical properties to replace injection-molded plastic products which have heretofore become a problem among plastic waste, and can be produced at a relatively low price.

The polyglycolic acid can be obtained, for example, by heating glycolide (i.e., a dimeric cyclic ester of glycolic acid) in the presence of a catalyst (for example, a cationic catalyst such as a tin organic carboxylate, tin halide or antimony halide), thereby subjecting it to bulk ring-opening polymerization or solution ring-opening polymerization. In order to obtain polyglycolic acid having excellent physical properties, it is preferable to use high-purity glycolide as a monomer. The high-purity glycolide can be obtained with good productivity by a process in which an oligomer of glycolic acid is mixed with a high-boiling polar organic solvent, the mixture is heated under ordinary pressure or reduced pressure to a temperature at which depolymerization of the oligomer occurs, thereby depolymerizing the oligomer in a state that the oligomer forms a solution phase, glycolide formed is distilled out together with the high-boiling polar organic solvent, and the glycolide is recovered from the distillate.

An example of a process for producing an injection-molded product from the polyglycolic acid includes a process in which the polyglycolic acid alone or a composition containing the polyglycolic acid is pelletized, the pellets thus obtained is charged into an injection molding machine to injection-mold them.

The polyglycolic acid can be industrially mass-produced by using extremely cheep raw materials of CO, $H_2O$ and $CH_2O$ or ethylene glycol. Since the injection molded product of the polyglycolic acid has degradability in soil, it scarcely imposes burden on the environment.

The present invention has been led to completion on the basis of these findings.

According to the present invention, there is thus provided an injection-molded product of polyglycolic acid obtainable by molding a thermoplastic resin material at an injection temperature ranging from the melting point, Tm of the polymer to 255° C., wherein the thermoplastic resin material comprises polyglycolic acid having a repeating unit represented by the following formula (1):

$$-\left[\text{O}-\text{CH}_2-\underset{\underset{\text{O}}{\|}}{\text{C}}\right]- \quad (1)$$

and the following physical properties:
(a) the melt viscosity, η* [as measured at a temperature of (the melting point, Tm of the polymer+20° C.) and a shear rate of 1,000/sec] being 30–10,000 Pa·s;
(b) the melting point, Tm being at least 150° C.;
(c) the melt enthalpy, ΔHm being at least 20 J/g; and
(d) the density being at least 1.50 g/cm³ as measured in an unoriented, crystallized form.

According to the present invention, there is also provided a process for producing an injection-molded product of polyglycolic acid, comprising the steps of charging an injection molding machine equipped with an injection mold with pellets formed of a thermoplastic resin material which comprises polyglycolic acid having a repeating unit represented by the following formula (1):

$$-\left[\text{O}-\text{CH}_2-\underset{\underset{\text{O}}{\|}}{\text{C}}\right]- \quad (1)$$

and the following physical properties:
(a) the melt viscosity, η* [as measured at a temperature of (the melting point, Tm of the polymer+20° C.) and a shear rate of 1,000/sec] being 30–10,000 Pa·s;
(b) the melting point, Tm being at least 150° C.;
(c) the melt enthalpy, ΔHm being at least 20 J/g; and
(d) the density being at least 1.50 g/cm³ as measured in an unoriented, crystallized form; injection-molding the pellets at a cylinder temperature of Tm to 255° C., a mold temperature of 0° C.-Tm and an injection pressure of 1–10⁴ MPa; and optionally annealing the molded product for 1 second to 10 hours at a temperature ranging from the crystallization temperature, $Tc_1$ of the polymer to Tm.

Among the injection-molded products according to the present invention, an injection-molded product of a neat polyglycolic acid resin, which has Izod impact strength (unnotched, 25° C.) of at least 20 kJ/m², may replace polyolefins, ABS resins, polybutylene terephthalate, polyacetal and polycarbonate which have high impact resistance.

Among the injection-molded products according to the present invention, an injection-molded product of a neat polyglycolic acid resin, which has flexural strength of at least 100 MPa and flexural modulus of at least 5 GPa, may replace high-stiffness injection-molded products which have become a problem among plastic waste.

Among the injection-molded products according to the present invention, an injection-molded product of a neat polyglycolic acid resin, which has tensile strength of at least 60 MPa and elongation of at least 5%, may replace high-strength injection-molded products which have become a problem among plastic waste.

DETAILED DESCRIPTION OF PREFERRED EMBODIMENTS

The present invention will hereinafter be described in detail.

Structure of Polymer

The polyglycolic acid useful in the practice of the present invention is a polymer having a repeating unit represented by the following formula (1):

$$-\left[\text{O}-\text{CH}_2-\underset{\underset{\text{O}}{\|}}{\text{C}}\right]- \quad (1)$$

The proportion of the repeating unit represented by the formula (1) in the polymer is generally at least 70 wt. %, preferably at least 80 wt. %, more preferably 90 wt. %. If the proportion of the repeating unit represented by the formula (1) is lower than 70 wt. %, there is a possibility that the crystallizability inherent in the polyglycolic acid may be impaired, and so the impact resistance, toughness and heat resistance of the resulting injection-molded product may be markedly deteriorated.

As examples of other repeating units than the repeating unit represented by the formula (1), may be mentioned a repeating unit represented by the following formula (2):

$$-\left[\text{O}-(\text{CH}_2)_n-\text{O}-\underset{\underset{\text{O}}{\|}}{\text{C}}-(\text{CH}_2)_m-\underset{\underset{\text{O}}{\|}}{\text{C}}\right]- \quad (2)$$

wherein n is 1–10, and m is 0–10, a repeating unit represented by the following formula (3):

$$-\left[\text{O}-\underset{(\text{CH}_2)_j\text{H}}{\text{CH}}-\underset{\underset{\text{O}}{\|}}{\text{C}}\right]- \quad (3)$$

wherein j is 1–10, a repeating unit represented by the following formula (4):

$$-\left[\text{O}-(\underset{\underset{R_2}{|}}{\overset{\overset{R_1}{|}}{\text{C}}})_k-\underset{\underset{\text{O}}{\|}}{\text{C}}\right]- \quad (4)$$

wherein $R_1$ and $R_2$ are independently a hydrogen atom or an alkyl group having 1–10 carbon atoms, and k is 2–10, and a repeating unit represented by the following formula (5):

$$-[\text{O}-\text{CH}_2-\text{O}-\text{CH}_2-\text{CH}_2]- \quad (5)$$

When these repeating units are introduced in a proportion of at least 1 wt. %, the melting point, Tm of the glycolic acid homopolymer can be lowered to lower the processing temperature of the polymer, whereby thermal decomposition upon melt processing can be reduced. Besides, the crystallization rate of the polyglycolic acid can also be controlled by the copolymerization to improve its injection moldability. However, if the proportion of these repeating units (2) to (5) exceeds 30 wt. %, there is a possibility that the crystallizability inherent in the polyglycolic acid may be impaired.

Physical Properties of Polymer

Molecular Weight-Melt Viscosity

The polyglycolic acid used as a raw material for the injection-molded product according to the present invention is a high-molecular weight polymer. The melt viscosity of the polymer can be used as an index to its molecular weight. The polyglycolic acid used in the present invention has a melt viscosity, $\eta^*$ of 30–10,000 Pa·s, preferably 50–8,000 Pa·s, more preferably 100–5,000 Pa·s as measured at a temperature of (Tm+20° C.) (i.e., a temperature corresponding to a usual melt-processing temperature) and a shear rate of 1,000/sec.

If the melt viscosity, $\eta^*$ of the polyglycolic acid is lower than 30 Pa·s, there is a possibility that the mechanical properties of the resulting injection-molded product may become insufficient. If the melt viscosity, $\eta^*$ of the polyglycolic acid is higher than 10,000 Pa·s on the other hand, there is a possibility that flowability of the polyglycolic acid may be insufficient upon its injection molding, and so its filling into a mold cavity may become short.

Thermal Properties

The melting point, Tm of the polyglycolic acid useful in the practice of the present invention is at least 150° C., preferably at least 190° C., more preferably at least 210° C. The melt enthalpy, $\Delta$Hm of the polyglycolic acid used in the present invention is at least 20 J/g, preferably at least 30 J/g, more preferably 40 J/g.

Polyglycolic acid having a Tm lower than 150° C. and/or a $\Delta$Hm smaller than 20 J/g is considered to be such that its degree of crystallinity is lowered due to the disorder of its intramolecular chemical structure, and consequently the Tm and/or $\Delta$Hm may be lowered. Accordingly, an injection-molded product formed from such a polyglycolic acid has a possibility that the impact resistance and toughness may be lower, and the heat resistance may also be insufficient.

Density

The polyglycolic acid used in the present invention has a density of at least 1.50 g/cm$^3$, preferably 1.51 g/cm$^3$, more preferably 1.52 g/cm$^3$ as measured in an unoriented, crystallized form. Polyglycolic acid having a density lower than 1.50 g/cm$^3$ is considered to be such that its degree of crystallinity is lowered due to the disorder of its intramolecular chemical structure, and consequently the density may be lowered. Accordingly, an injection-molded product formed from such a polyglycolic acid has a possibility that the degree of crystallinity may be low, and the impact resistance, toughness and heat resistance may be insufficient.

General Properties of Injection-Molded Product

Degradability in Soil

The injection-molded product according to the present invention is a soil-degradable molded product which scarcely imposes burden on the environment. More specifically, when the injection-molded product of the polyglycolic acid according to the present invention is buried at the depth of 10 cm under the ground, it is degraded within generally 24 months, preferably 12 months to lose its original form. For example, the conventional injection-molded product of polylactic acid involves a problem that since the glass transition temperature, Tg of polylactic acid is too high, the injection-molded product is difficult to be composted under ordinary conditions. On the other hand, the injection-molded product according to the present invention is formed from the polyglycolic acid the Tg of which is not very high, so that it is possible to compost it under ordinary conditions.

Impact-Resistant Injection-Molded Product

Among the injection-molded products of a neat polyglycolic acid resin according to the present invention, those having high Izod impact strength (unnotched, 25° C.) have extremely high impact strength of at least 20 kJ m$^2$, preferably 30 kJ/m$^2$, more preferably 40 kJ/m$^2$. The injection-molded products having such high Izod impact strength are unrivaled in the injection-molded products of the conventional soil-degradable neat resins containing no impact modifier.

A soil-degradable injection-molded product having higher impact strength can be obtained by using such a high impact-resistant polyglycolic acid as a neat resin or in combination with an impact modifier or the like. When a composition obtained by blending a neat polyglycolic acid resin and various kinds of fillers and thermoplastic resins, or a composition of the neat resin with an impact modifier is used in place of the neat resin, a soil-degradable injection-molded product having extremely high impact strength can be obtained. Incidentally, when the Izod impact strength of an injection-molded product is too low, there is a possibility that it may be broken during its shipping or use.

High-Toughness Injection-Molded Product

An injection-molded product resistant to flexural stress can be obtained by using the above-described specific polyglycolic acid. More specifically, the present invention can provide an injection-molded product having flexural strength of generally at least 100 MPa, preferably at least 150 MPa, more preferably at least 200 MPa. With respect to flexural modulus, an injection molded product having flexural modulus of generally at least 5 GPa, preferably at least 6 GPa, more preferably at least 7 GPa can be obtained. The soil-degradable injection-molded product formed of a neat resin and having such a high flexural strength or flexural modulus is unrivaled in the injection-molded products of the conventional soil-degradable resins. The polyglycolic acid as a neat resin or a composition containing the polyglycolic acid as a base resin can provide a soil-degradable injection-molded product having such extremely high stiffness and toughness as not found in the conventional soil-degradable injection-molded products.

The present invention can provides an injection-molded product resistant to tensile stress. More specifically, the present invention can provide an injection-molded product having tensile strength of generally at least 60 MPa, preferably at least 80 MPa, more preferably at least 100 MPa. With respect to tensile elongation, an injection molded product having tensile elongation of generally at least 5%, preferably at least 7%, more preferably at least 9% can be obtained. The injection-molded product exhibiting such a high tensile strength or tensile elongation is unrivaled in the injection-molded products of the conventional biodegradable plastics. The polyglycolic acid as a neat resin or a composition containing the polyglycolic acid as a base resin can provide a soil-degradable injection-molded product having such extremely high strength and toughness as not found in the conventional soil-degradable injection-molded products.

Production Process of Injection-Molded Product

Raw Polymer

The polyglycolic acid used as a raw material of the injection-molded products according to the present invention can be prepared by the following processes (1) and (2).

(1) The polyglycolic acid can be obtained by a process in which glycolide, which is a dimeric ester of glycolic acid, is heated to a temperature of about 120–250° C. in the presence of a small amount of a catalyst (for example, a cationic catalyst such as a tin organic carboxylate, tin halide or antimony halide), thereby subjecting it to ring-opening polymerization. The ring-opening polymerization is preferably conducted by a bulk polymerization process or solution polymerization process. (2) The polyglycolic acid can be obtained by a polycondensation process wherein glycolic acid or an alkyl glycolate is heated in the presence or absence of a catalyst, thereby subjecting it to dehydration or dealcoholization.

In order to obtain a glycolic acid copolymer, it is only necessary to copolymerize glycolide, glycolic acid or an alkyl glycolate in accordance with the above process (1) or (2) in suitable combination with, as a comonomer, for example, a cyclic monomer such as ethylene oxalate (i.e., 1,4-dioxane-2,3-dione), lactide, a lactone (for example, β-propiolactone, β-butyrolactone, pivalolactone, γ-butyrolactone, δ-valerolactone, β-methyl-δ-valerolactone or ε-caprolactone), trimethylene carbonate or 1,3-dioxane; a hydroxycarboxylic acid such as lactic acid, 3-hydroxypropanoic acid, 3-hydroxybutanoic acid, 4-hydroxybutanoic acid or 6-hydroxycaproic acid or an alkyl ester thereof; a substantially equimolar mixture of an aliphatic diol such as ethylene glycol or 1,4-butanediol and an aliphatic dicarboxylic acid such as succinic acid or adipic acid or an alkyl ester thereof; or two or more compounds thereof. The glycolic acid copolymer may be that obtained by subjecting the polyglycolic acid and another polymer having repeating units selected from among the formulae (2) to (4) to transesterification under heat. Of the above preparation processes, the process (1) in which glycolide is subjected to ring-opening polymerization is preferred because a high-molecular weight polyglycolic acid is easy to be obtained.

As the glycolide used as a monomer in the process (1), glycolide obtained by "a solution-phase depolymerization process" (Japanese Patent Application No. 48000/1996) developed by the present inventors is preferred to that obtained by the conventional sublimation depolymerization process of a glycolic acid oligomer because a high-purity product can be mass-produced at a higher yield. The use of high-purity glycolide as a monomer permits the easy provision of high-molecular weight polyglycolic acid.

The solution-phase depolymerization process is performed by (1) heating a mixture containing a glycolic acid oligomer and at least one high-boiling polar organic solvent having a boiling point within a range of 230–450° C. to a temperature, at which the depolymerization of the oligomer takes place, under ordinary pressure or under reduced pressure; (2) dissolving the oligomer in the solvent until a residual rate (volume ratio) of a melt phase of the oligomer reaches 0.5 or lower; (3) further continuing the heating at the same temperature to depolymerize the oligomer; (4) distilling out a dimeric cyclic ester (i.e., glycolide) formed together with the high-boiling polar organic solvent; and (5) recovering glycolide from the distillate.

Examples of the high-boiling polar organic solvent include aromatic carboxylic acid esters, such as bis(alkoxyalkyl)phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling polar organic solvent is used in a proportion of generally 0.3–50 times (weight ratio) to the oligomer. Polypropylene glycol, polyethylene glycol, tetraethylene glycol or the like may be used as a solubilizing agent for the oligomer in combination with the high-boiling polar organic solvent as needed. The depolymerization of the glycolic acid oligomer is generally conducted at 230° C. or higher, preferably 230–320° C. Although the depolymerization is performed under atmospheric pressure or reduced pressure, it is preferable to heat the oligomer under reduced pressure of 0.1–90.0 kPa (1–900 mbar) to depolymerize it.

Thermoplastic Resin Material

In the present invention, a neat resin of the polyglycolic acid can be used as a thermoplastic resin material by itself. A composition obtained by incorporating inorganic fillers, other thermoplastic resins, plasticizers and the like into the polyglycolic acid within limits not impeding the object of the present invention may also be used as the thermoplastic resin material. More specifically, there may be used a composition (compound) obtained by incorporating the inorganic fillers, other thermoplastic resins and plasticizers in proportions of 0–100 parts by weight, 0–100 parts by weight and 0–200 parts by weight, respectively, per 100 parts by weight of the polyglycolic acid. If the inorganic fillers or other thermoplastic resins are used in a proportion exceeding 100 parts by weight, or the plasticizers are used in a proportion exceeding 200 parts by weight, there is a possible problem that the impact resistance, toughness and heat resistance of the resulting injection-molded product may become insufficient, or the melt processability of the composition may be deteriorated.

Examples of the inorganic fillers include powders, whiskers and fibers of inorganic materials such as alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass and potassium titanate. These inorganic fillers may be used either singly or in any combination thereof. Although the inorganic fillers are generally used in a proportion of 0–100 parts by weight per 100 parts by weight of the polyglycolic acid, it is desirable to use them in a range of preferably 0.01–50 parts by weight, more preferably 0.05–10 parts by weight taking impact resistance and toughness into consideration.

Examples of the other thermoplastic resins include a homopolymer and copolymers of lactic acid, a homopolymer and copolymers of ethylene oxalate, a homopolymer and copolymers of ε-caprolactone, polysuccinates, polyhydroxybutanoic acid, hydroxybutanoic acid-hydroxyvaleric acid copolymers, cellulose acetate, polyvinyl alcohol, starch, polyglutamates, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene-butylene·styrene block copolymers, ABS resins, MBS resins and ethylene-vinyl alcohol copolymers. These thermoplastic resins may be used either singly or in any combination thereof. Although these thermoplastic resins are generally used in a proportion of 0–100 parts by weight per 100 parts by weight of the polyglycolic acid, it is desirable to use them in a proportion of preferably at most 50 parts by weight, more preferably at most 30 parts by weight taking impact resistance, toughness and degradability in soil into consideration.

Examples of the plasticizers include phthalates such as di(methoxyethyl)phthalate, dioctyl phthalate, diethyl phthalate and benzylbutyl phthalate; benzoates such as diethylene glycol dibenzoate and ethylene glycol dibenzoate; aliphatic dibasic acid esters such as octyl adipate and octyl sebacate; aliphatic tribasic acid esters such as tributyl acetylcitrate; phosphates such as dioctyl phosphate and tricresyl phosphate; epoxy plasticizers such as epoxidized soybean oil; and polyalkylene glycol esters such as polyethylene glycol sebacate and polypropylene glycol laurate. These plasticizers may be used either singly or in any combination thereof. Although the plasticizers are generally used in a proportion of 0–200 parts by weight per 100 parts by weight of the polyglycolic acid, it is desirable to use them in a proportion of preferably at most 100 parts by weight, more preferably at most 50 parts by weight taking impact resistance, toughness and heat resistance into consideration.

In the present invention, various additives such as heat stabilizers, light stabilizers, moistureproofing agents, waterproofing agents, water repellents, lubricants, releasing agents, coupling agents, pigments and dyes may be contained in the thermoplastic resin material as needed. These various additives are used in an effective amount as necessary for the end application intended.

The composition is prepared by a method known per se in the art by feeding the polyglycolic acid and optionally at least one of the inorganic fillers, thermoplastic resins, plasticizers and other additives into a kneading extruder to melt and knead them at a cylinder temperature of from Tm to 255° C. (generally, 150–255° C.), extruding them into a strand, and cooling and chopping the strand into pellets. If the melting and kneading temperature exceeds 255° C., there is a possibility that the thermal decomposition of the polymer may be easy to take place, and rapid decrease in molecular weight and bubbling attendant upon the decomposition may occur.

Production of Injection-Molded Product

The injection-molded product according to the present invention can be produced by charging an injection molding machine equipped with an injection mold with pellets formed of the neat resin of the polyglycolic acid or the composition comprising the polyglycolic acid, injection-molding the pellets at a cylinder temperature of Tm to 255° C. (generally 150–255° C.), a mold temperature of 0° C.-Tm (generally 0–190° C.) and an injection pressure of 1–104 MPa (preferably 10–104 MPa); and optionally annealing the molded product for 1 second to 10 hours at a temperature ranging from the crystallization temperature, $Tc_1$ to Tm (generally 70–2200). If the cylinder temperature exceeds 255° C., there is a possibility that the thermal decomposition of the polymer may be easy to take place, and rapid decrease in molecular weight and bubbling attendant upon the decomposition may occur. There is also a possibility that the mechanical properties of the resulting injection-molded product may be deteriorated to a marked extent.

Application Fields

The injection-molded products of polyglycolic acid according to the present invention can be used in a wide variety of fields making good use of its features of high impact resistance, high modulus·high strength and high heat distortion resistance. They can be used as, for example, daily sundries (such as tableware, boxes·cases, bottles, kitchenware and flower pots), stationery products, electric appliances (such as various kinds of cabinets), containers for electronic ranges, containers for boiling water pouring type instant food, various kinds of disposable ware (such as soup plates and cups), and various kinds of other injection-molded products.

ADVANTAGES OF THE INVENTION

According to the present invention, there can be provided injection-molded products, which exhibit good degradability in soil and have excellent impact resistance, toughness and heat resistance and sufficient physical properties to replace injection-molded plastic products which have heretofore become a problem among plastic waste, at a relatively low price. The injection-molded products according to the present invention can be used in a variety of fields making good use of these excellent properties, for example, as daily sundries, stationery products, electric appliances, containers for electronic ranges, containers for boiling water pouring type instant food and various kinds of disposable ware.

EMBODIMENTS OF THE INVENTION

The present invention will hereinafter be described more specifically by the following Synthesis Examples, Examples and Comparative Examples.

Measuring Methods of Physical Properties (1) Melt Viscosity, $\eta^*$

As indices to the molecular weights of polymers, their melt viscosities, $\eta^*$ were measured. A crystallized sheet obtained by heating an amorphous sheet about 0.2 mm thick of each polymer at about 150° C. for 5 minutes was used as a sample, and the melt viscosity of the sample was measured at a temperature of (Tm+20° C.) and a shear rate of 1,000/sec by means of a "Capirograph" (trade name, manufactured by Toyo Seiki Seisakusho, Ltd.) equipped with a nozzle having a diameter (D) of 0.5 mm and a length (L) of 5 mm.

(2) Thermal Properties of Polymer

An amorphous sheet about 0.2 mm thick of each polymer was used as a sample and heated by means of a differential scanning calorimeter (DSC; TC-10A Model, manufactured by METTLER INSTRUMENT AG) at a rate of 10° C./min under a nitrogen gas stream, thereby measuring the crystallization temperature ($Tc_1$), melting point (Tm) and melt enthalpy ($\Delta$Hm) of the sample. Incidentally, the glass transition temperature (Tg) was measured at a heating rate of 5° C./min.

(3) Density of Unoriented, Crystallized Sheet

A sheet obtained by heat-setting an amorphous sheet about 0.2 mm thick of each polymer at about 150° C. for 5 minutes was used as a sample, and the density of the sample was measured in accordance with JIS R 7222 (a pycnometer method making use of n-butanol).

(4) Izod Impact Strength (25° C., Unnotched)

Measured in accordance with the method prescribed in JIS K 7110.

(5) Flexural Strength and Flexural Modulus

Measured in accordance with the method prescribed in JIS K 7113.

(6) Tensile Strength and Elongation

Measured in accordance with the method prescribed in JIS K 7113.

(7) Degradability in Soil

A specimen of each polymer for the measurement of tensile properties was buried at the depth of 10 cm under the ground of a plowland. The specimen was dug up at intervals of a half month to observe its shape. The time the shape of the specimen began to deform was observed, whereby the polymer was ranked as being soil-degradable where the shape of the specimen began to degrade within 24 months after buried under ground.

SYNTHESIS EXAMPLE 1

Synthesis of Monomer

A 10-liter autoclave was charged with 5.25 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 20 kPa (200 mbar), and the reaction mixture was held for 2 hours under such a pressure, thereby distilling off low-boiling matter to prepare a glycolic acid oligomer. The melting point, Tm of the thus-obtained oligomer was 205° C.

A 10-liter flask was charged with 1.26 kg of the glycolic acid oligomer, and 5.25 kg of benzylbutyl phthalate (product of Junsei Chemical Co., Ltd.) as a solvent and 158 g of polypropylene glycol (#400, product of Junsei Chemical Co., Ltd.) as a solubilizing agent were added. The mixture was heated to 270° C. under reduced pressure of 5 kPa (50 mbar) in a nitrogen gas atmosphere to conduct "solution-phase depolymerization" of the oligomer. Glycolide formed was distilled out together with benzylbutyl phthalate.

Cyclohexane about twice as much as the distillate by volume was added to the distillate collected, whereby glycolide was crystallized from benzylbutyl phthalate and collected by filtration. The glycolide thus obtained was recrystallized from ethyl acetate and dried under reduced pressure, thereby obtaining glycolide at a yield of about 78%.

POLYMER PREPARATION EXAMPLE 1

A PFA-made cylinder was charged with 210 g of glycolide obtained in Synthesis Example 1, and the glycolide was dried at room temperature for about 30 minutes while introducing nitrogen gas. Then, 0.042 g of $SnCl_4.6.5H_2O$ as a catalyst was added, and the contents were held at 170° C. for 2 hours while introducing nitrogen gas therein, thereby polymerizing glycolide. After completion of the polymerization, the cylinder was cooled down to room temperature, and a bulk polymer taken out of the cylinder was ground into fine particles having a particle size of about 3 mm or smaller. The fine particles were dried overnight at about 150° C. under reduced pressure of about 0.1 kPa to remove a remaining monomer, thereby obtaining polyglycolic acid [Polymer (P-1)]. The same process was conducted repeatedly to produce a necessary amount of Polymer (P-1).

POLYMER PREPARATION EXAMPLE 2

Polymerization and post-treatment were performed in the same manner as in Polymer Preparation Example 1 except that a mixture of 200 g of glycolide and 10 g of ethylene oxalate (1.4-dioxane-2,3-dione) was used in place of 210 g of glycolide, thereby obtaining a glycolic acid-ethylene oxalate copolymer [Polymer (P-2)]. The same process was conducted repeatedly to prepare a necessary amount of Polymer (P-2).

POLYMER PREPARATION EXAMPLE 3

Polymerization and post-treatment were performed in the same manner as in Polymer Preparation Example 1 except that a mixture of 200 g of glycolide and 10 g of L-(-)-lactide was used in place of 210 g of glycolide, thereby obtaining a glycolic acid-lactide copolymer [Polymer (P-3)]. The same process was conducted repeatedly to prepare a necessary amount of Polymer (P-3).

POLYMER PREPARATION EXAMPLE 4

L-(-)-Lactide (product of Tokyo Kasei Kogyo Co., Ltd.) was recrystallized from ethanol to purify it. A PFA-made cylinder was charged with 210 g of the purified L-(-)-lactide, and the lactide was dried at room temperature for about 30 minutes while introducing nitrogen gas. Then, 0.053 g of tin octanoate as a catalyst was added, and the contents were held at 130° C. for 10 hours while introducing nitrogen gas therein, thereby polymerizing the lactide. After completion of the polymerization, the cylinder was cooled down to room temperature, and a bulk polymer taken out of the cylinder was ground into fine particles having a particle size of about 3 mm or smaller. The fine particles were dried overnight at about 100° C. under reduced pressure of about 0.1 kPa to remove a remaining monomer, thereby obtaining polylactide [Polymer (CP-1)]. The same process was conducted repeatedly to produce a necessary amount of Polymer (CP-1).

POLYMER PREPARATION EXAMPLE 5

Polymerization and post-treatment were performed in the same manner as in Polymer Preparation Example 1 except that the catalyst, $SnCl_4.6.5H_2O$ was not added, thereby obtaining polyglycolic acid [Polymer (CP-2)]. The same process was conducted repeatedly to produce a necessary amount of Polymer (CP-2).

The physical properties of the polymers obtained in Polymer Preparation Example 1–5 are shown in Table 1.

TABLE 1

| | Polymer Preparation Example | | | | |
|---|---|---|---|---|---|
| | 1 | 2 | 3 | 4 | 5 |
| Composition of(*1) Monomer (wt/wt) | GA | GA/EX = 95/5 | GA/LA = 95/5 | LA | GA |
| Polymer code | P-1 | P-2 | P-3 | CP-1 | CP-2 |
| η* (Pa · s) | 440 | 390 | 420 | 320 | 27 |
| Thermal properties | | | | | |
| Tg (° C.) | 38 | 38 | 38 | 53 | 37 |
| $Tc_1$ (° C.) | 83 | 77 | 74 | 105 | 80 |
| Tm (° C.) | 220 | 214 | 215 | 175 | 220 |
| ΔHm (J/g) | 71 | 64 | 67 | 51 | 73 |
| Density of crystallized product (g/cm³) | 1.58 | 1.57 | 1.56 | 1.26 | 1.58 |

(*1): GA = Glycolide; EX = Ethylene oxalate, LA = Lactide.

EXAMPLE 1

Polymer (P-1) was charged into a small twin-screw extruder equipped with a nozzle having a diameter of 3 mm under a nitrogen gas stream, and extruded into a strand at a melt temperature of about 230° C.–235° C. The strand was quenched and chopped to obtain Pellet (No. 1).

This Pellet (No. 1) was charged into an injection molding machine and molded into a specimen for the measurement of physical properties under injection conditions of a cylinder temperature of 230° C., a mold temperature of 100° C. and an injection pressure of 49 MPa. The molded product was further annealed at 150° C. for 10 minutes to obtain Injection-molded Specimen (M1-1).

EXAMPLE 2

Pellet (No. 2) was prepared in the same manner as in Example 1 except that a mixture obtained by adding 5.0 parts by weight of carbon fibers (diameter: 20 μm; length: 0.7 mm; M-107T, trade name; product of Kureha Kagaku Kogyo Co., Ltd.) and 0.1 part by weight of boric acid anhydride to 100 parts by weight of Polymer (P-2) was used, and the cylinder temperature was changed to about 225–230° C. Injection-molded Specimen (M2-1) was obtained in the same manner as in Example 1 except that Pellet (No. 2) was used, and the cylinder temperature was changed to about 225° C.

EXAMPLE 3

Pellet (No. 3) was prepared in the same manner as in Example 1 except that a mixture of 100 parts by weight of Polymer (P-3) and 0.1 part by weight of silica powder was used, and the cylinder temperature was changed to about 225–230° C. Injection-molded Specimen (M3-1) was obtained in the same manner as in Example 1 except that Pellet (No. 3) was used, and the cylinder temperature was changed to about 225° C.

COMPARATIVE EXAMPLE 1

Pellet (No. C1) was prepared in the same manner as in Example 1 except that Polymer (CP-1) obtained in Polymer Preparation Example 4 was used, and the cylinder temperature was changed to about 185–190° C. Injection-molded Specimen (MC1-1) was obtained in the same manner as in Example 1 except that Pellet (No. C1) was used, and the cylinder temperature was changed to about 185° C.

COMPARATIVE EXAMPLE 2

Pellet (No. C2) was prepared in the same manner as in Example 1 except that Polymer (CP-2) obtained in Polymer Preparation Example 5 was used. Injection-molded Specimen (MC2-1) was obtained in the same manner as in Example 1 except that Pellet (No. C2) was used.

COMPARATIVE EXAMPLE 3

Injection molding was attempted in the same manner as in Example 1 except that the cylinder temperature of the injection molding machine was preset to 260° C. However, the polymer rapidly decomposed during the injection, resulting in a failure to obtain a normal injection-molded product. Therefore, the injection molding was stopped.

The injection-molded specimens obtained in these Examples and Comparative Examples were used to measure their physical properties. The results are shown collectively in Table 2.

TABLE 2

|  | Example | | | Comp. Example | | |
| --- | --- | --- | --- | --- | --- | --- |
|  | 1 | 2 | 3 | 1 | 2 | 3 |
| Polymer code | P-1 | P-2 | P-3 | CP-1 | CP-2 | P-1 |
| Composition |  |  |  |  |  |  |
| Kind of additive | — | *1 | *2 | Silica | — | — | — |
| Amount added | — | 5.0 | 0.1 | 0.1 | — | — | — |
| (parts by weight) |  |  |  |  |  |  |
| Pellet code | 1 | 2 | 3 | C1 | C2 | 1 |
| Physical properties of |  |  |  |  |  |  |
| injection-molded product |  |  |  |  |  |  |
| Izod strength | 43 | 45 | 41 | 10 | 3 | — |
| (kJ/m²) |  |  |  |  |  |  |
| Flexural strength | 220 | 220 | 200 | 80 | 30 | — |
| (MPa) |  |  |  |  |  |  |
| Flexural modulus | 6.8 | 6.9 | 6.2 | 3.5 | 6.2 | — |
| (GPa) |  |  |  |  |  |  |
| Tensile strength | 130 | 140 | 125 | 50 | 30 | — |
| (MPa) |  |  |  |  |  |  |

TABLE 2-continued

|  | Example | | | Comp. Example | | |
| --- | --- | --- | --- | --- | --- | --- |
|  | 1 | 2 | 3 | 1 | 2 | 3 |
| Elongation (%) | 18 | 13 | 18 | 5 | 3 | — |
| Degradability in | High | High | High | High | High | — |
| soil |  |  |  |  |  |  |
| Remarks |  | Composition | Composition |  |  | *3 |

*1: Carbon fibers.
*2: Boric acid anhydride.
*3: Molding was stopped.

What is claimed is:

1. A process for producing an injection-molded product of polyglycolic acid, comprising the steps of charging an injection molding machine equipped with an injection mold with pellets formed of a thermoplastic resin material which comprises polyglycolic acid having a repeating unit represented by the following formula (1):

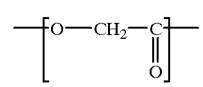

(1)

and the following physical properties:

(a) the melt viscosity, $\eta^*$ (as measured at a temperature of the melting point, Tm of the polymer+20° C., and a shear rate of 1,000/sec) being 30–10,000 Pa·s;

(b) the melting point, Tm being at least 150° C.;

(c) the melt enthalpy, $\Delta$Hm being at least 20 J/g; and (d) the density being at least 1.50 g/cm³ as measured in an unoriented, crystallized form; and injection-molding the pellets at a cylinder temperature of Tm to 255° C., a mold temperature of 0° C.-Tm and an injection pressure of $1-10^4$ MPa.

2. The production process according to claim 1, wherein the injection molding was performed at a cylinder temperature of 150–255° C., a mold temperature of 0° C.–190° C. and an injection pressure of $10-10^4$ MPa.

3. The production process according to claim 1, which further comprises, after the injection molding, annealing the molded product for 1 second to 10 hours at a temperature ranging from the crystallization temperature, $Tc_1$ of the polymer to the melting point, Tm.

4. The production process according to claim 1, wherein the pellets formed of the thermoplastic resin material are those obtained by charging a single- or twin-screw extruder with the thermoplastic resin material, melting and kneading the material, extruding the melt into a strand and chopping the strand.

* * * * *